United States Patent Office 3,661,832
Patented May 9, 1972

3,661,832
POLYTRIMELLITAMIDE-IMIDES IN
PHENOLIC SOLVENTS
James R. Stephens, Gary, Ind., assignor to
Standard Oil Company, Chicago, Ill.
No Drawing. Continuation-in-part of applications Ser. No. 252,557, Jan. 21, 1963, Ser. No. 336,857, Jan. 10, 1964, Ser. No. 535,367, Mar. 18, 1966, and Ser. No. 631,173, Apr. 17, 1967, which is a continuation-in-part of application Ser. No. 535,367. This application May 20, 1970, Ser. No. 39,177
Int. Cl. C08g 20/32, 51/34
U.S. Cl. 260—33.4 P                                              6 Claims

ABSTRACT OF THE DISCLOSURE

An aromatic polytrimellitamide-imide solution suitable for producing smooth continuous coatings and wire enamels at baking temperatures of about 400° F. said solution comprising said polytrimellitamide-imide and phenols or substituted phenols. A process for producing wire enamels wherein said aromatic polytrimellitamides are dissolved in phenol or alkyl substituted phenols and a process for preparing polytrimellitamide-imide polymers in alkyl substituted phenol solutions.

This application is a continuation-in-part of application Ser. No. 252,557, filed Jan. 21, 1963, and application Ser. No. 336,857 filed Jan. 10, 1964, Ser. No. 535,367 filed Mar. 18, 1966 and Ser. No. 631,173 filed Apr. 17 1967 now abandoned which is a continuation-in-part of application Ser. No. 535,367.

This invention relates to aromatic polytrimellitamide-imide polymers and their use in producing insulation on wire and other surfaces and more particularly to the preparation of particular solutions of the polymers and their use as wire enamels.

The polymers may be described as polyamides having some polyimide linkages; said polyamides are capable, when heated, of conversion to the polyamide-imide form. Such polyamides are high molecular weight polymeric compounds having in their molecules units of

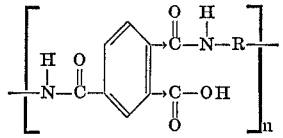

wherein → denotes isomerism and wherein R is a divalent aromatic organic radical. This oragnic radical consists of R', which is a divalent aromatic hydrocarbon radical or two R' divalent aroamtic hydrocarbon radicals joined by stable linkages —O—, —CH$_2$—,

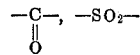

and —S—, as are in the groups —R'—, O—R'—, —R'—CH$_2$—R'—,

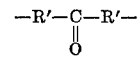

—R'—SO$_2$—R'— and R'—S—R'—. The molecular weight of these polyamides is sufficiently high to produce upon heating a film-forming polymer. Said amides are susceptible to condensation by heating to a polyamide-imide having to a substantial extent recurring units of

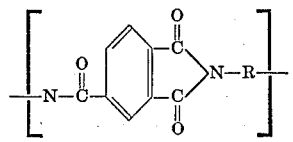

wherein R is a divalent aromatic organic radical in which in addition to hydrogen, nitrogen, sulfur and oxygen atoms can be attached to the carbon atoms. This organic radical consists of R', which is a divalent aromatic hydrocarbon radical or two R' divalent aromatic hydrocarbon radicals joined by stable linkages —O—, —CH$_2$—,

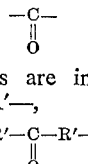

—SO$_2$— and —S—, as are in the groups —R'—, O—R'—, —R'—CH$_2$—R'—,

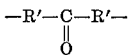

—R'—SO$_2$—R'— and R'—S—R'—.

The prior art polytrimellitamide polymers have been prepared in organic solvents containing nitrogen. Representative solutions have been N,N-dimethylacetamide, N-methyl pyrrolidone, and the like. These solvents are relatively uncommon and their high cost tends to preclude extensive commercialization of the polytrimellitamides. Furthermore these solvents cannot be operated at a temperature of 100–200° C. required to eliminate the hydrogen halides which inhibit the utility of these polymer solutions as wire enamels. It has been discovered that excellent wire enamel coatings are produced when the polytrimellitamides are prepared using phenol or alkyl substituted phenols as solvents. Useful solvents include phenol, o-, p-, m-cresols, xylenols either singly or as mixtures thereof. The cresol isomers are commonly known as cresylic acids. The novel process of this invention is a simplified process in that reaction by-product hydrogen chloride evolved by the reaction of the acid chloride of trimellitic acid anhydride with the primary diamine need not be removed in a special process step as required in the prior art. The hydrogen chloride is given off in a gaseous form. This is a significant advantage over the prior art.

According to the process of this invention, an acyl halide derivative of trimellitic anhydride and an aromatic diamine are reacted in the presence of phenol or an alkyl substituted phenol serving as a solvent for the reaction to produce te polyamide-imide. The phenol or alkyl substituted phenol solvents can be diluted with various aromatic hydrocarbons boiling about 80–300° C. These aromatic hydrocarbons are benzene, toluene, o-xylene, m-xylene, p-xylene, hemimellitene, pseudocumene and the like. Such polyamide-imides include two types of useful products. One type, as indicated above, is the polyamide wherein the linking groups are predominantly amido although some may be imido and wherein the polymeric structure contains free caboxyl groups wich are capable of further reaction. The other type, the polyamide-imides, are the polymers which have been subjected to further heat treatment and have very little free carboxyl group but usually have a significantly higher molecular weight. The polymers, as formed, have an amide content which varies from approximately 55 to 100% and the imide content is from 0 to 45 percent. The polyamide-imides, after heat curing, theoretically contain 50 percent amide linkages and 50 percent imide linkages.

The first type of the polymers of the invention may be defined as those soluble in organic solvents and capable of further reaction upon application of heat. They may be employed in solution, in high solids suspensions, or as powders in the production of coatings, laminates, films, fibers, molded products and as impregnating varnishes. The second type of polymers—the polyamide-imides—are much less soluble than the amides and when they have been heat cured they are generally insoluble in organic solvents and may be regarded as cured end-product in the way of coatings, laminates, films, enamel-wire coatings and the like. The latter are characterized by resistance to solvents, by high thermal stability and good electrical characteristics.

According to the process of this invention, the polyamide products are prepared by reacting acyl halide derivatives of trimellitic anhydride (1,2,4-benzene tricarboxylic acid anhydride) with an aromatic primary diamine in the presence of aromatic carbocyclic alcohols as solvents. The preferred primary aromatic diamines are p,p'-methylenebis(aniline), p,p'-oxybis(aniline), (p-aminophenyl) sulfone, and p,p'-phenylenediamine. The preferred solvents are phenol, o-, p-, m-cresols, xylenols, either singly or as mixtures thereof commonly known as cresylic acids. The phenol or alkyl substitued phenols may be diluted up to 30% with aromatic hydrocarbons. The preferred hydrocarbons are xylene, toluene or commercial aromatic hydrocarbon fractions.

The reaction is suitably carried out at a temperature of about 100–200° C. The time of reaction depends primary on the temperature, varying from about 1 to 24 hours, with 4 to 15 hours at 160 to 100° C. preferred. The structure of the amine can also affect the rate of reaction. It should be noted that the amine type solvents used in the prior art cannot generally be utilized at a temperature of 100–200° C. because the presence of the hydrogen chloride in these solvents at those temperatures results in degradation of the polymer.

The aromatic polytrimellitamide solution suitable for producing a wire coating at elevated temperatures comprises about 12 to about 30 weight percent of said polytrimellitamide and a phenol or alkyl substituted phenol as a solvent. These phenol or alkyl substituted phenols may be diluted up to about 30% with the aromatic hydrocarbons named above. The liquid film of the resulting solution is heated at a temperature of about 200–500° C. to produce a smooth continuous coating.

The acyl halide derivative is reacted in the phenol or alkyl substituted phenols with an aromatic diamine having one or more aromatic ring and two primary amino groups. These aromatic diamines have the formula $H_2N-R'-NH_2$, $H_2N-R'-O-R'-NH_2$ $H_2N-R'-CH_2-R'-NH_2$

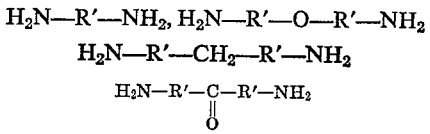

$H_2N-R'-SO_2-R'-NH_2$, and $H_2N-R'-S-R'-NH_2$ wherein R' is a divalent aromatic hydrocarbon radical hereinbefore indicated. The aromatic content of the diamine provides the thermal properties in the polymer while the primary amino groups permit the desired imide rings and amide linkages to be formed in the polymer. Generally the aromatic diamine has from one to about four aromatic rings, advantageously from one to about two aromatic rings. The aromatic diamines having more than one aromatic ring may be further characterized as polycyclic aromatic compounds having two primary aromatic rings which may be interconnected by condensation, as in naphthalene or phenanthrene type structures, or may be bridged, either directly as in diphenyl diamines, or indirectly as, for example, two R' groups joined with reactive stable inert linkages such as oxy, alkyl, carbonyl, sulfonyl, and other relatively inactive groups such as sulfide group, as hereinbefore described. The alkyl group may be illustrated by methylene ethylene, substituted derivatives such as 1,1-dimethylmethylene, and the like. Suitable nuclei, the R' divalent aromatic hydrocarbon radical, include phenylene, naphthalene, anthrylene, naphthacenylene and the like; diphenylene, terephenylene, phenylnaphthalene, quaterphenylene and the like; and aromatic rings separated by oxy, carbyl, carbonyl, sulfonyl and thio groups.

Advantageously, the linkages between the aromatic groups are oxy, or methylene, and the amino groups are in the meta or para position in the aromatic nucleus. The polyamide polymers have molecular weights above about 7,000 and the polyamide-imide polymers have molecular weight in excess of about 9,000. The defined polyamide of the first reaction as described hereinabove is soluble in organic solvents. Using the aromatic carbocyclic alcohols as solvents, solutions containing about 12 to about 30 percent solids by weight are obtainable. For applications requiring use of solutions for producing wire coatings, impregnating varnishes and the like; solutions of about 15 to about 25 weight percent and advantageously about 18 percent are desired. Such concentrations provide solutions with a good balance between solids content and solution viscosity for ease of handling in most practical applications. The viscosities for such solutions are in the range of about 3 to about 150 poises. For example, the viscosity of phenol-cresol solutions having about 17 percent solids is about 30 poises at a temperature of 25° C.

By way of particular example, p,p'-methylenebis(aniline) or any other primary carbocyclic diamine is dissolved in phenol and aromatic hydrocarbons solvent such as xylene. An excess of the phenol is used sufficient to dissolve the primary diamine. Then an equivalent amount of the 4-acid chloride of trimellitic anhydride, which contains essentially no free trimellitic anhydride, in granular form, is added so that the mole ratio of the primary diamine to the acid chloride does not vary by more than ±3 mole percent. The reaction is heated up to about 125–150° C. After several hours at the elevated temperature the viscosity of the solution generally is a maximum value.

The following examples illustrate some embodiments of this invention. It will be understood that these are for illustrative purposes only and do not purport to be wholly definitive with respect to conditions or scope.

EXAMPLE I

A solution was made up by co-dissolving 320 g. of phenol and 80 g. of commercial aromatic hydrocarbon fraction boiling at 150–200° C. A mixture was then made with 364.6 g. of the above solvent and 46.59 g. of p,p'-methylenebis(aniline). This was stirred 20 minutes at room temperature, then 49.48 g. of trimellitoyl chloride anhydride was added in 20 minutes. The temperature of the exothermic solution rose 47° C. The solution was then heated up to 125° C., allowing for escape of HCl, in 25 minutes. After 1 hour at this temperature the product had a viscosity of 2.6 poises measured at 25° C. It was spread on a 24 gauge copper panel and baked 3 minutes at 600° F. The baked coating was clear. The panel upon being impacted by 160 in.-lbs. on the reverse side showed no cracking or peeling. When the panel was bent over a ⅛" mandrel and then impacted at the crease the coating remained integral.

EXAMPLE II

A solvent was made up by co-dissolving 64 parts of phenol, 16 parts of commercial cresylic acid, and 20 parts of commercial aromatic hydrocarbon fraction boiling at 200–250° C. To 441.8 g. of this solution was then added 46.59 g. of p,p'-methylenebis(aniline). The mixture was stirred and purged with nitrogen for 10 minutes at room temperature, then 49.48 g. of 4-trimellitoyl chloride anhydride was added in 20 minutes. The temperature rose to 47° C. on this operation. The mixture was then heated to 125° C. for 4 hours. The solution was then cooled to room tempearture. At this point it had a viscosity of 4.4 poises. The following day the solution was heated an additional 2½ hours at 125° C., then cooled and inspected. It was clear and had a viscosity of 8.8 poises. A coating on a 24-gauge copper panel was prepared by heating the coated panel for three minutes at 600° F. The coated panel upon being impacted by 160 in.-lbs. on reverse impact showed no cracking or peeling. A similar bake on glass gave a clear coating that was stripped off as a free film that was tough and could be creased many times without cracking. The percentage solids of the solution was 16.6% by test evaporation of 2 g. for 10 minutes at 600° F. Some of it was poured into tetrahydrofuran in a slow stream whereupon the polymer precipitated. The solid polymer was dried under vacuum at 48° C. It had an acidic titer of 0.33 meq./g. by titration with 1/10 N NaOCH₃ in methanol. The solids could be redissolved in N-methylpyrrolidone at 25% solids to yield a solution of 8 poises viscosity. This solution when cast and baked on copper and glass also gave tough and flexible coatings as before in its original phenolic solution.

EXAMPLE III

A mixture of 3007 g. of commercial grade Cresylic Acid (in composition approximately 50% phenol and 50% mixed cresol isomers) and 335 g. of toluene and 385.24 g. of p,p'-methylenebis(aniline) was made up and stirred to effect solution. Then at 25° C. 409.14 g. of 4-trimellitoyl chloride anhydride was added in 15 minutes. The temperature of the initial reaction rose to 51° C. in this time, then subsided to 48° C. over the next 25 minutes. The mixture was then heated to reflux (140–148°) and held at reflux 2 hours. Water of condensation azeotroped with the refluxing toluene. This was collected with a reflux condenser and Dean-Stark trap and amounted to 29 grams. Hydrogen chloride was also evolved. This was allowed to vent out through the condenser. Heating was then continued at these temperatures another 35 minutes however all the toluene plus an additional 14 g. of water was allowed to distill out of the reaction mixture which was then cooled to room temperature.

The reaction solution was clear, had a viscosity of 74.2 poise (Brookfield at 25° C.) and 19.8% solids by determination on a 2 gram sample at 600° F. for 10 minutes. It was diluted to 17% solids with Cresylic Acid and filtered to produce a solution of 29 poises in viscosity.

This solution of 29 poises as a magnet wire enamel formulation was used to coat #18 A.W.G. copper wire in a vertical oven at temperatures of 400° C. to 460° C. under conditions of commercial production of magnet wire enamel. The wire produced was smooth and had the following properties:

1. To be amenable to automatic winding and normal abuse the wire should take a full snap. This means it should be capable of being drawn rapidly to break (about 40% elongation) and have the stretched portion of coating on the wire remain integral, i.e., it should have no cracks (brittleness) or "tube" which means poor adhesion, or the coating essentially separating from the substrate. In other words, the stretched portion must be a dielectric. In addition to snap it is desirable that the stretched portion of the snapped wire be wound about a mandrel as small as possible. The mandrels are 1, 2, 3 etc. times the wire diameter and are named 1X, 2X, 3X, etc. Hence, a rating terminology for flexural properties is Snap-Smallest Passing Mandrel or SSPM. An SSPM of 1 is the top rating. More realistically on a commercially acceptable scale SSPM of 2 is very good, 3 is good, 4 is acceptable, 5 is poor. Our sample passed the full Snap test and scored very good (2) on the Snap-Smallest Passing Mandrel test.

Thermoplastic flow of our sample on A.W.G. #18 wire was 365–386° C.

What is claimed is:

1. In a process for producing a polyamide-imide for use as a wire enamel from an acyl halide of trimellitic anhydride and an aromatic primary diamine wherein the aromatic radical consists essentially of divalent mono and poly aromatic hydrocarbons containing 1 to 4 aromatic rings wherein said multiple rings are joined directly or by members selected from the group consisting of sulfur, oxide, carbonyl, sulfonyl and lower alkylene groups, in which hydrogen halide of reaction is produced; the improvement in said process comprising reacting the acyl halide of trimellitic anhydride and the diamine in phenol or a mixture of phenol and alkyl substituted phenols at a first lower temperature and then heating the reaction mixture to about 100–200° C. to remove the entrained hydrogen halide thus eliminating the corrosive tendencies of said hydrogen halide and making the resulting solution useful as a wire enamel.

2. The process of claim 1 wherein the acyl halide is the 4-acid chloride of trimellitic anhydride.

3. The process of claim 1 wherein said diamine is p,p'-methylenebis(aniline).

4. The process of claim 1 wherein said diamine is p,p'-oxybis(aniline).

5. The process of claim 1 wherein the reaction is conducted in any mixture of phenols, cresol isomers and xylenols.

6. In a process for producing a polyamide-imide for use as a wire enamel from an acyl halide of trimellitic anhydride and an aromatic primary diamine wherein the aromatic radical consists essentially of divalent mono and poly aromatic hydrocarbons containing 1 to 4 aromatic rings wherein said multiple rings are joined directly or by members selected from the group consisting of sulfur, oxide, carbonyl, sulfonyl and lower alkylene groups, in which hydrogen halide of reaction is produced; the improvement in said process comprising reacting the acyl halide of trimellitic anhydride and the diamine in phenol or a mixture of phenol and alkyl substituted phenol solvent and an aromatic hydrocarbon as a co-solvent boiling at about 80° to 300° C. at a first lower temperature and then heating the reaction mixture to about 100° to 200° C. to remove the entrained hydrogen halide thus eliminating the corrosive tendencies of said hydrogen halide and making the resulting solution useful as a wire enamel.

References Cited

UNITED STATES PATENTS

| | | | |
|---|---|---|---|
| 3,260,691 | 7/1966 | Lavin | 260—30.2 |
| 3,347,828 | 10/1967 | Stephens et al. | 260—47 |
| 3,523,098 | 8/1970 | Holub | 260—33.4 |
| 3,277,043 | 10/1966 | Holub | 260—334 |
| 3,347,808 | 10/1967 | Lavin et al. | 260—29.1 |

MORRIS LIEBMAN, Primary Examiner

R. ZAITLEN, Assistant Examiner

260—30.2 R, 787 F

U.S. Cl. X.R.